US012677116B2

(12) United States Patent
Jiang et al.

(10) Patent No.: US 12,677,116 B2
(45) Date of Patent: Jul. 7, 2026

(54) MESSAGE TRANSMISSION METHOD, SIGNAL SENDING METHOD, AND COMMUNICATION DEVICE

(71) Applicant: VIVO MOBILE COMMUNICATION CO., LTD., Dongguan (CN)

(72) Inventors: Dajie Jiang, Dongguan (CN); Jian Yao, Dongguan (CN); Ye Si, Dongguan (CN); Peng Sun, Dongguan (CN); Fei Qin, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 265 days.

(21) Appl. No.: 18/522,703

(22) Filed: Nov. 29, 2023

(65) Prior Publication Data

US 2024/0098462 A1     Mar. 21, 2024

Related U.S. Application Data

(63) Continuation of application No. PCT/CN2022/096328, filed on May 31, 2022.

(30) Foreign Application Priority Data

Jun. 4, 2021     (CN) .......................... 202110624807.2

(51) Int. Cl.
*H04W 4/38*          (2018.01)
*H04L 27/26*        (2006.01)
*H04W 24/10*        (2009.01)

(52) U.S. Cl.
CPC .......... *H04W 4/38* (2018.02); *H04L 27/2614* (2013.01); *H04W 24/10* (2013.01)

(58) Field of Classification Search
CPC ........... H04W 4/06; H04W 4/12; H04W 4/38; H04W 28/10
See application file for complete search history.

(56) References Cited

U.S. PATENT DOCUMENTS

| | | | |
|---|---|---|---|
| 8,620,686 B1 | 12/2013 | Reinecke et al. | |
| 2014/0080519 A1 | 3/2014 | Ahmed | |
| 2018/0278701 A1* | 9/2018 | Diem ...................... | H04W 4/20 |
| 2019/0090158 A1* | 3/2019 | Das ......................... | H04L 67/12 |
| 2021/0076367 A1 | 3/2021 | Bayesteh et al. | |

(Continued)

FOREIGN PATENT DOCUMENTS

| | | |
|---|---|---|
| CN | 106534239 A | 3/2017 |
| CN | 109451430 A | 3/2019 |

(Continued)

OTHER PUBLICATIONS

Zte et al., "Channel sensing based scheme for cross-link interference mitigation in NR", 3GPP TSG RAN WG1 Meeting #88, Athens, Greece, Feb. 13-17, 2017, R1-1701617.

*Primary Examiner* — Sam Bhattacharya
(74) *Attorney, Agent, or Firm* — The Webb Law Firm

(57) ABSTRACT

A message transmission method includes receiving, by a second device, a first message sent by a first device. The first message indicates at least one of the following: a sensing resolution related requirement; a sensing distance related requirement; a sensing area related requirement; a sensing object related requirement; a sensing error related requirement; a sensing signal quality related requirement; or a sensing delay related requirement.

20 Claims, 4 Drawing Sheets

(56)　　　　　　　References Cited

U.S. PATENT DOCUMENTS

| 2022/0159426 | A1 | 5/2022 | Du et al. |
| 2022/0263640 | A1 | 8/2022 | Liu et al. |

FOREIGN PATENT DOCUMENTS

| CN | 110189174 | A | 8/2019 |
| CN | 112398601 | A | 2/2021 |
| WO | 2014180254 | A1 | 11/2014 |
| WO | 2021023093 | A1 | 2/2021 |
| WO | 2021084887 | A1 | 5/2021 |

* cited by examiner

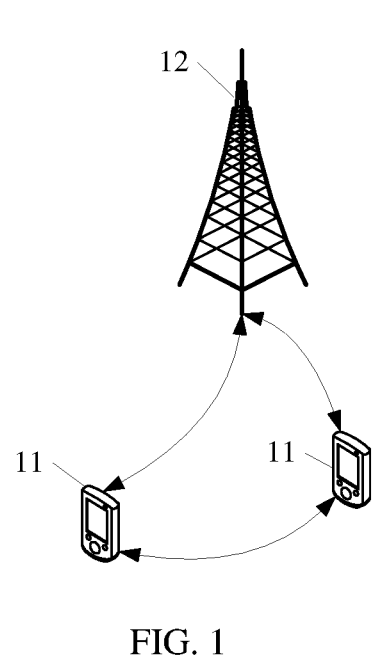
FIG. 1
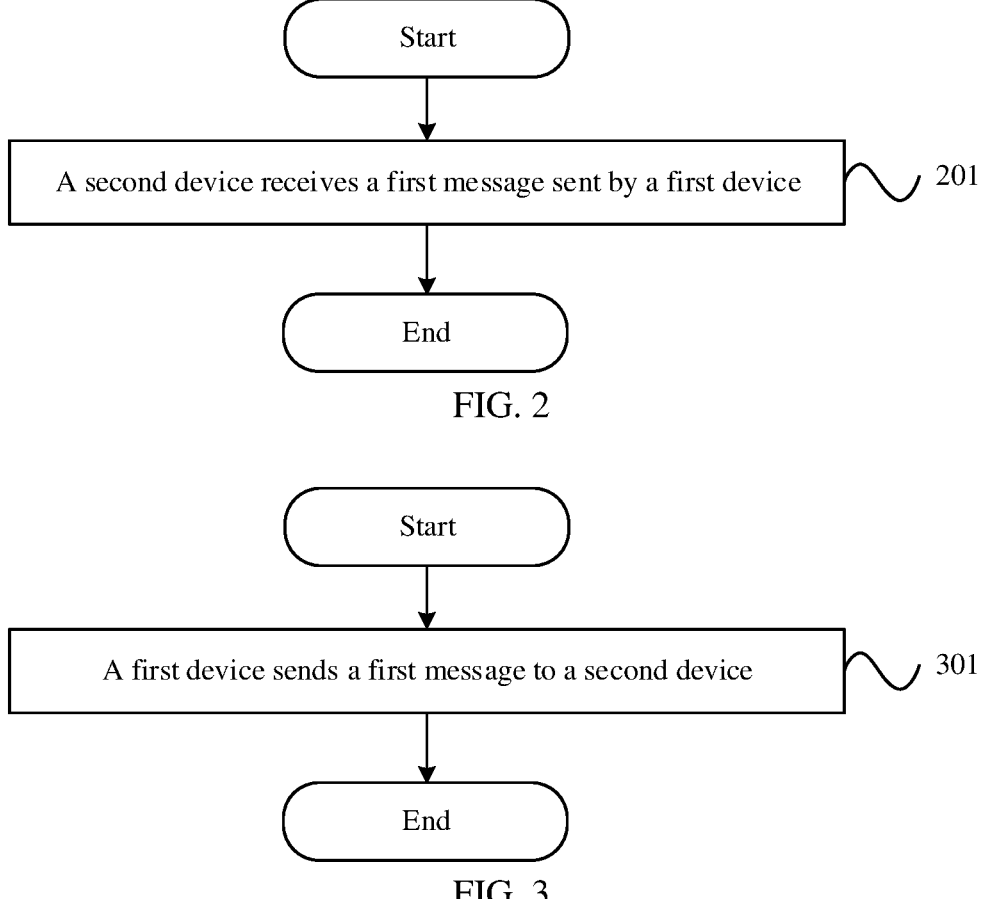
FIG. 2
FIG. 3

MESSAGE TRANSMISSION METHOD, SIGNAL SENDING METHOD, AND COMMUNICATION DEVICE

CROSS-REFERENCE TO RELATED APPLICATIONS

This application is a Bypass Continuation Application of International Patent Application No. PCT/CN2022/096328 filed May 31, 2022, and claims priority to Chinese Patent Application No. 202110624807.2 filed Jun. 4, 2021, the disclosures of which are hereby incorporated by reference in their entireties.

BACKGROUND OF THE INVENTION

Field of the Invention

This application relates to the field of communications technologies, and in particular, to a message transmission method and apparatus, a signal sending method, and a communication device.

Description of Related Art

Future mobile communication systems, for example, a beyond 5-th generation (B5G) system or a 6-th generation (6G) system, have both communication capabilities and sensing capabilities. One or more devices having sensing capabilities can sense, through sending and receiving of wireless signals, information such as an orientation, a distance, and a velocity of a target object, or perform detection, tracking, identification, imaging, or the like on the target object, an event, an environment, or the like. In the future, with deployment of small base stations with large bandwidth capabilities such as millimeter waves and terahertz in a 6G network, sensing resolution is significantly improved compared with millimeter waves, such that the 6G network can provide a more refined perception service.

SUMMARY OF THE INVENTION

According to a first aspect, a message transmission method is provided, including: receiving, by a second device, a first message sent by a first device, where the first message indicates at least one of the following:
a sensing resolution related requirement;
a sensing distance related requirement;
a sensing area related requirement;
a sensing object related requirement;
a sensing error related requirement;
a sensing signal quality related requirement; or
a sensing delay related requirement.

According to a second aspect, a message transmission method is provided, including:
sending, by a first device, a first message to a second device, where the first message indicates at least one of the following:
a sensing resolution related requirement;
a sensing distance related requirement;
a sensing area related requirement;
a sensing object related requirement;
a sensing error related requirement;
a sensing signal quality related requirement; or
a sensing delay related requirement.

According to a third aspect, a signal sending method is provided, including:

receiving, by a third device, a second message sent by a second device, where the second message indicates configuration information of a first signal, and the first signal is a signal used for sensing, or the first signal is a signal for integrated sensing and communication; and
sending, by the third device, the first signal based on the configuration information of the first signal.

According to a fourth aspect, a message transmission apparatus is provided, applied to a second device. The apparatus includes:
a first receiving module, configured to receive a first message sent by a first device, where the first message indicates at least one of the following:
a sensing resolution related requirement;
a sensing distance related requirement;
a sensing area related requirement;
a sensing object related requirement;
a sensing error related requirement;
a sensing signal quality related requirement; or
a sensing delay related requirement.

According to a fifth aspect, a message transmission apparatus is provided, applied to a first device. The apparatus includes:
a second sending module, configured to send a first message to a second device, where the first message indicates at least one of the following:
a sensing resolution related requirement;
a sensing distance related requirement;
a sensing area related requirement;
a sensing object related requirement;
a sensing error related requirement;
a sensing signal quality related requirement; or
a sensing delay related requirement.

According to a sixth aspect, a signal sending apparatus is provided, applied to a third device. The apparatus includes:
a fourth receiving module, configured to receive a second message sent by the second device, where the second message indicates configuration information of a first signal, and the first signal is a signal used for sensing, or the first signal is a signal for integrated sensing and communication; and
a fourth sending module, configured to send the first signal based on the configuration information of the first signal.

According to a seventh aspect, a communication device is provided. A communication device includes a processor, a memory, and a program or instructions stored in the memory and executable on the processor, where when the program or the instructions are executed by the processor, steps of the method according to the first aspect are implemented; when the program or the instructions are executed by the processor, steps of the method according to the second aspect are implemented; or when the program or the instructions are executed by the processor, steps of the method according to the third aspect are implemented.

According to an eighth aspect, a communication device is provided, and includes a processor and a communication interface. The communication interface is configured to receive a first message sent by a first device, or the communication interface is configured to send a first message to a second device. The first message indicates at least one of the following:
a sensing resolution related requirement;
a sensing distance related requirement;
a sensing area related requirement;
a sensing object related requirement;
a sensing error related requirement;

a sensing signal quality related requirement; or a sensing delay related requirement.

Alternatively, the communication interface is configured to receive a second message sent by a second device. The second message indicates configuration information of a first signal. The first signal is a signal used for sensing, or the first signal is a signal for integrated sensing and communication. The processor is configured to send, through the communication interface, the first signal based on the configuration information of the first signal.

According to a ninth aspect, a non-transitory readable storage medium is provided. The non-transitory readable storage medium stores a program or instructions. When the program or the instructions are executed by a processor, steps of the method according to the first aspect are implemented, or steps of the method according to the second aspect are implemented, or steps of the method according to the third aspect are implemented.

According to a tenth aspect, a chip is provided. The chip includes a processor and a communication interface. The communication interface is coupled to the processor. The processor is configured to run a program or instructions to implement the method according to the first aspect, or the method according to the second aspect, or the method according to the third aspect.

According to an eleventh aspect, a computer program/program product is provided. The computer program/program product is stored in a storage medium. When the computer program/program product is executed by at least one processor, steps of the method according to the first aspect are implemented, or steps of the method according to the second aspect are implemented, or steps of the method according to the third aspect are implemented.

BRIEF DESCRIPTION OF THE DRAWINGS

FIG. 1 is a block diagram of a wireless communication system in which an embodiment of this application is used;

FIG. 2 is a first schematic diagram of steps of a message transmission method according to an embodiment of this application;

FIG. 3 is a second schematic diagram of steps of a message transmission method according to an embodiment of this application;

DESCRIPTION OF THE INVENTION

Figures 4, 5, 6, 7:
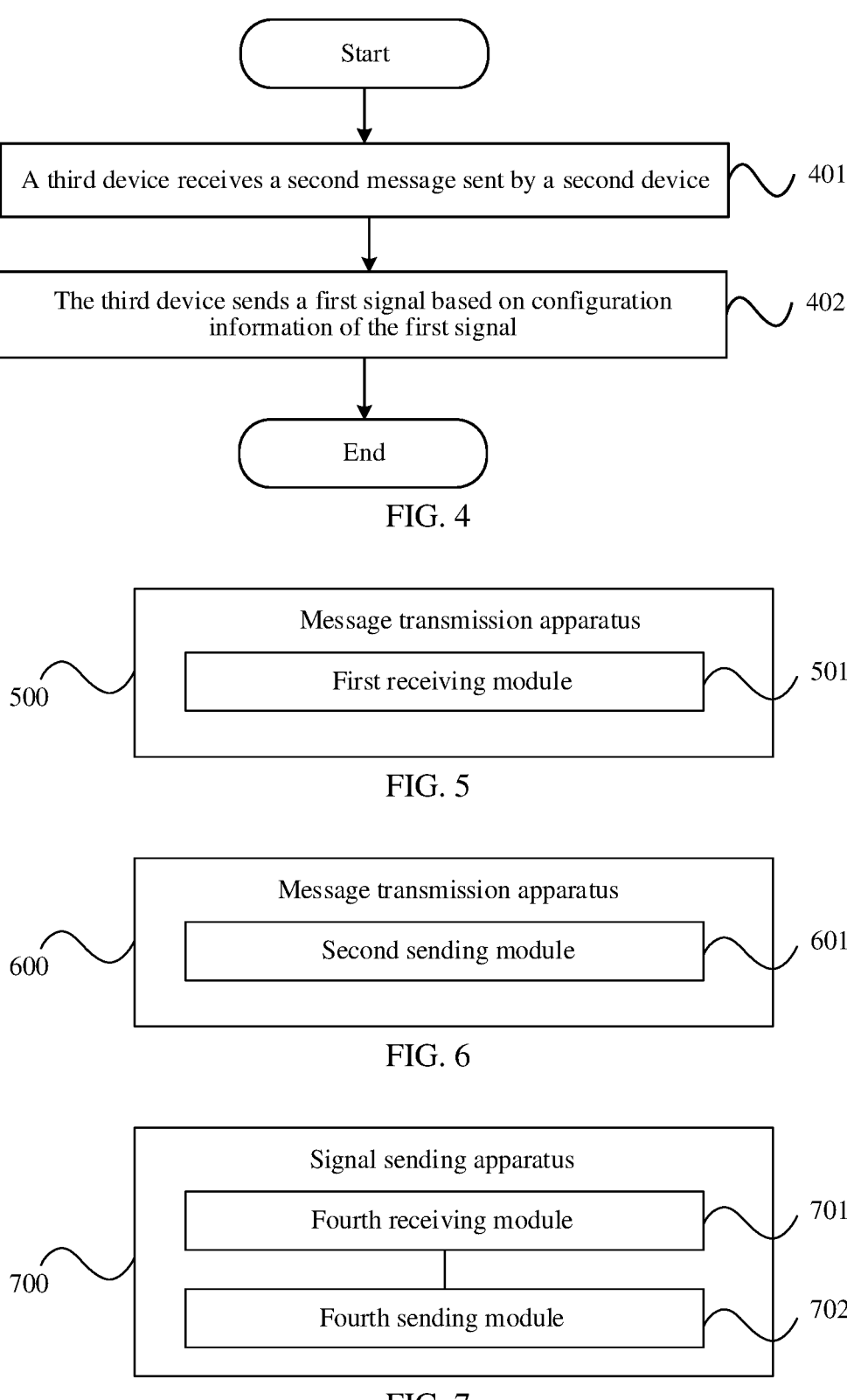
FIG. 4 is a schematic diagram of steps of a signal sending method according to an embodiment of this application.
FIG. 5 is a first schematic diagram of a structure of a message transmission apparatus according to an embodiment of this application.
FIG. 6 is a second schematic diagram of a structure of a message transmission apparatus according to an embodiment of this application.
FIG. 7 is a schematic diagram of a structure of a signal sending apparatus according to an embodiment of this application.

The technical solutions in embodiments of this application are clearly described in the following with reference to the accompanying drawings in the embodiments of this application. Apparently, the described embodiments are merely some rather than all of the embodiments of this application. All other embodiments obtained by a person skilled in the art based on the embodiments of this application fall within the scope of protection of this application.

In the specification and claims of this application, terms such as "first" and "second" are used to distinguish similar objects, and are not used to describe a specific sequence or order. It is to be understood that such terms can be interchanged as appropriate, so that the embodiments of this application can be implemented in an order different from the order shown or described herein. Moreover, objects distinguished by "first" and "second" generally belong to one type, and the quantity of objects is not limited. For example, there may be one or more first objects. In addition, "and/or" used in the specification and the claims represents at least one of the connected objects. The character "/" generally represents an "or" relationship between associated objects.

It is worth noting that the technologies described in the embodiments of this application are not limited to a long term evolution (LTE)/LTE-advanced (LTE-A) system, and may further be applied to various wireless communication systems such as code division multiple access (CDMA), time division multiple access (TDMA), frequency division multiple access (FDMA), orthogonal frequency division multiple access (OFDMA), single carrier frequency division multiple access (SC-FDMA), and other systems. In the embodiments of this application, terms "system" and "network" generally can be interchanged as appropriate. The technology described herein can be applied to the systems and radio technologies mentioned above, and can also be applied to other systems and radio technologies. The description below describes new radio (NR) for purposes of example, and NR terminology is used in much of the description below, although the technologies can also be applied to applications other than NR system applications, such as a 6-th generation 6G communication system.

FIG. 1 is a block diagram of a wireless communication system in which an embodiment of this application is used. The wireless communication system includes a terminal 11 and a network-side device 12. The terminal 11 may also be referred to as a terminal device or user equipment (UE). The terminal 11 may be a terminal-side device, such as a mobile phone, a tablet personal computer, a laptop computer or a notebook computer, a personal digital assistant (PDA), a palmtop computer, a netbook, an ultra-mobile personal computer (UMPC), a mobile Internet device (MID), a wearable device or vehicle user equipment (VUE), or pedestrian user equipment (PUE). The wearable device includes: a smart watch, a wrist band, earphones, glasses, or the like. It should be noted that the type of the terminal 11 is not limited in the embodiments of this application. The network-side device 12 may be a base station or a core network. The base station may be referred to as a Node B, an evolved Node B, an access point, a base transceiver station (BTS), a radio base station, a radio transceiver, a basic service set (BSS), an extended service set (ESS), a Node B, an evolved Node B (eNB), a home Node B, a home evolved Node B, a WLAN access point, a Wi-Fi node, a transmission and reception point (TRP), or another appropriate term in the art. Provided that a same technical effect is achieved, the base station is not limited to a specific technical term. It should be noted that in the embodiments of this application, only a base station in an NR system is used as an example, but a type of the base station is not limited.

The following describes the message transmission method and apparatus, the signal sending method and apparatus, and the communication device provided in embodiments of this application by using some embodiments and application scenarios thereof with reference to the accompanying drawings.

The purposes of sensing include two main categories. A first category of purpose is sensing for assisting communications or enhancing communication performance, for example, a base station tracks movement of a device to provide a more accurate beamforming alignment device. The other category of purpose is sensing not directly related to communications, for example, a base station monitors a weather situation through a wireless signal, and an electronic device wirelessly senses and identifies a gesture of a user through millimeter waves.

There are several sensing modes as follows:

Active sensing: A device performs sensing by using a reflected signal of a transmitted signal of the device, such as an echo, transceivers are located at a same location, different antennas may be adopted, and surrounding environment information of the device can be sensed.

Passive sensing: Transceivers are located at different locations, and a receiver performs sensing by using a wireless signal transmitted by a sender, for example, a base station A senses environment information between the base station A and a base station B by receiving a wireless signal from the base station B.

Interactive sensing: A sensor and a target object agree on a subject, time, frequency, a format, and the like of electromagnetic wave transmission through information interaction, to complete a sensing process.

Air interface design of the B5G system or 6G system supports both wireless communication signals and wireless sensing signals, and through communications and sensing integrated means such as signal co-design and/or hardware sharing, integrated design of communications and sensing functions (which can be referred to as integrated communications and sensing) is achieved. The B5G system or 6G system can have sensing capabilities or provide sensing services while transferring information. Advantages brought by the integrated communications and sensing include the following aspects: saving costs; reducing a device size; reducing device power consumption; improving spectrum efficiency; and reducing mutual interference between sensing and communications, and improving system performance.

However, in some practical application scenarios, because a terminal and a base station have inconsistent understandings on a format of a sensing signal and the like, or have inconsistent understandings on sensing requirements, it is easy to cause a problem that a sensing signal cannot effectively meet sensing requirements.

Application scenarios involved in the embodiments of this application include at least the following:

Scenario 1: A terminal device sends a millimeter wave sensing signal and then receives an echo of the sensing signal, for detecting a gesture of a user, or for purposes such as scanning an outline of an object in a black box. Signal formats under different sensing purposes or sensing requirements are different. A terminal clearly knows the sensing purpose, and also knows the format of a sensing signal corresponding to the sensing purpose. However, a millimeter wave band used for sensing is a licensed band, and requires unified management of a base station, to avoid mutual interference between a sensing signal and a communication signal, or between sensing signals.

Scenario 2: A terminal expects that a base station sends a specific sensing signal, and the terminal receives the signal, for detecting a weather situation, building conditions, pedestrian flow conditions, or the like between the base station and the terminal. Signal formats under different sensing purposes or sensing requirements are different. However, the base station needs to obtain a sensing purpose or a sensing requirement of the terminal before the base station can determine what format of sensing signal to send can meet the sensing requirement of the terminal.

As illustrated in FIG. 2, an embodiment of this application provides a message transmission method, including:

Step 201: A second device receives a first message sent by a first device, where the first message indicates at least one of the following:

a sensing resolution related requirement;
a sensing distance related requirement;
a sensing area related requirement;
a sensing object related requirement;
a sensing error related requirement;
a sensing signal quality related requirement; or
a sensing delay related requirement.

In embodiments of this application, the first device is a device having a sensing requirement. The first device may be a base station, a terminal, a device to device link sidelink device, a sensing server, or the like. The second device is a control device of a first signal, such as a computing unit of a location management function (LMF). The second device may be a base station, a terminal, a device to device link sidelink device, a sensing server, or the like.

It should be noted that the second device may be an independently arranged device, or may be a unit attached to another device. For example, a second device may be configured on a first device, or may be configured on a third device.

A sensing signal mentioned in the embodiments of this application may also be referred to as a signal for sensing, or a signal for integrated sensing and communication. A communication device can sense, through sending and receiving of a sensing signal, information such as an orientation, a distance, and a velocity of a target object, or perform detection, tracking, identification, imaging, or the like on the target object, an event, an environment, or the like.

In at least one optional embodiment of this application, the sensing resolution related requirement includes at least one of range resolution, velocity resolution, angular resolution, imaging resolution, temperature resolution, air pressure resolution, or humidity resolution. The sensing resolution related requirement further includes air quality related resolution or the like. For example, a range resolution requirement is 1 meter, a velocity resolution requirement is 1 Km per hour, an angular resolution requirement is 2 degrees, an imaging resolution requirement is 5 cm by 5 cm, temperature resolution is 1° C., or the like.

In at least one optional embodiment of this application, the sensing distance related requirement includes at least one of a maximum sensing distance or a sensing distance range.

In at least one optional embodiment of this application, the sensing signal quality related requirement includes at least one of received signal strength, a signal to noise ratio, a signal to interference plus noise ratio, a signal to clutter ratio, a signal sidelobe feature, or a peak to average power ratio (PAPR) of a sensing signal. For example, received signal strength of a sensing signal is greater than −80 dBm, a signal to noise ratio or signal to interference plus noise ratio requirement is greater than 5 dB, or a signal to clutter ratio requirement or a signal to clutter and noise ratio requirement is 10 dB. For another example, sidelobe signal strength of a sensing signal is lower than main lobe signal strength by 10 dB. The sensing signal quality related requirement may also be transmitted power of the sensing signal. For example, a first device may obtain a transmitted power requirement of a sensing signal based on estimated path loss between a second device and the first device and a received signal strength requirement of the sensing signal.

For example, a first device reports a PAPR requirement of a sensing signal to a second device. If the PAPR requirement is less strict, the second device configures, for the first device, a first signal based on orthogonal frequency-division multiplexing (OFDM). If the PAPR requirement is strict, the second device configures, for the first device, a sensing signal based on single-carrier frequency-division multiple access (SC-FDMA) or a first signal based on frequency modulated continuous wave (FMCW).

In at least one optional embodiment of this application, the sensing object related requirement includes a weather situation (temperature, humidity, or the like), an object of a traffic monitoring class such as a vehicle, crowd density, environment, terrain or building conditions, a gesture or an action of a human being, or the like.

In at least one optional embodiment of this application, the sensing area related requirement includes a specific area in the traffic monitoring class, a specific area associated with a 3D building scenario reconstructed by a sensing signal, or the like.

In at least one optional embodiment of this application, the sensing delay related requirement includes at least one of the following:

a sending time or a sending time window of a sensing signal; or a feedback time or a feedback time window of a measurement quantity associated with the sensing signal.

For example, after a first device sends a first message, the first device or a third device sends a time window of the first signal. Alternatively, after a second device receives a first message, a first device or a third device sends a time window of the first signal. Alternatively, a first device sends a first message and then obtains a time window for sensing information feedback.

It should be noted that in at least one embodiment of this application, content indicated by the first message may be sent by one first message, or by a plurality of first messages, which is not limited herein.

It should be noted that in the embodiments of this application, the first message may directly indicate a sensing related requirement, or may indirectly indicate a sensing related requirement by indicating a sensing type, where different sensing types are associated with different sensing related requirements.

For example, a first device directly indicates a sensing related requirement. Content included in the first message is as shown in Table 1.

TABLE 1

| Sensing related requirement | Value |
| --- | --- |
| Range resolution | 1 m |
| Maximum sensing distance | 100 m |
| Velocity resolution | 10 Km/h |
| Minimum movement velocity | −120 Km/h |

TABLE 1-continued

| Sensing related requirement | Value |
| --- | --- |
| Maximum movement velocity | 120 Km/h |
| Maximum error allowed by sensing service | 5% |
| Geographic area | Absolute geographic area coordinates or relative geographic area coordinates, or an identifier for a geographic area |

For another example, a first message indicates a sensing type, and the sensing type is associated with a sensing related requirement. Table 2 shows a scenario where a base station sends a first signal. Table 3 shows a scenario where a terminal sends a first signal.

TABLE 2

| Number | Sensing type | Sensing related requirement |
| --- | --- | --- |
| 1 | Traffic monitoring | Range resolution 1 m<br>Maximum sensing distance 100 m<br>Velocity resolution 10 Km/h<br>Minimum movement velocity −120 Km/h<br>Maximum movement velocity 120 Km/h<br>Geographic area: **An area within 100 m around a square |
| 2 | Crowd monitoring | Range resolution 1 m<br>Maximum sensing distance 100 m<br>Velocity resolution 3 Km/h<br>Minimum movement velocity −30 Km/h<br>Maximum movement velocity 30 Km/h<br>Geographic area: **Crowd monitoring in a square |
| 3 | Environment construction 1 | Range resolution 5 m<br>Maximum sensing distance 200 m<br>Geographic area: **An area within 100 m around a square |
| 4 | Environment construction 2 | Range resolution 2 m<br>Maximum sensing distance 100 m |
| . . . | . . . | |

TABLE 3

| Number | Sensing type | Sensing requirement |
| --- | --- | --- |
| 1 | Gesture identification | Range resolution 5 cm<br>Maximum sensing distance 2 m<br>Velocity resolution 1 m/s<br>Minimum movement velocity −5 m/s<br>Maximum movement velocity +5 m/s |
| 2 | Object scanning | Range resolution 1 cm<br>Maximum sensing distance 0.5 m |
| 3 | Crowd monitoring | Range resolution 1 m<br>Maximum sensing distance 10 m<br>Velocity resolution 2 Km/h<br>Minimum movement velocity −10 Km/h<br>Maximum movement velocity 10 Km/h |
| 4 | Environment construction | Range resolution 1 m<br>Maximum sensing distance 20 m<br>Geographic area: **An area within 100 m around a square |
| . . . | . . . | |

As an optional embodiment of this application, the method further includes:

The second device determines configuration information of a first signal. The first signal is a signal used for sensing, or the first signal is a signal for integrated sensing and communication. In other words, the second device determines configuration information of a first signal based on indication of the first message.

As another optional embodiment of this application, the method further includes:

The second device sends a second message to the first device and/or a third device, where the second message indicates configuration information of a first signal, such that the first device or the third device sends the first signal based on the configuration information of the first signal.

The first signal is a signal used for sensing, or the first signal is a signal for integrated sensing and communication.

In the embodiments of this application, the third device may be a first signal sending device, or may be a first signal receiving device. The third device may be a base station, a terminal, a sidelink device, a sensing device, or the like, which is not limited herein.

It should be noted that the first message mentioned in the embodiments of this application may also indicate sending the first signal by the first device, or sending the first signal by the third device. The second device sends, to a corresponding device, the configuration information of the first signal based on the indication of the first message.

The configuration information of the first signal indicates at least one of the following:

a waveform of the first signal, where for example, the second device determines, based on the indication content of the first message, which one of signals such as OFDM, SC-FDMA, OTFS (OTFS), FMCW, and pulse signals the first signal is;

a sub-carrier spacing of the first signal, for example, a minimum sub-carrier spacing, or a maximum sub-carrier spacing, or a sub-carrier spacing range, where a minimum sub-carrier spacing of an OFDM system is generally configured to be obviously greater than a maximum Doppler frequency offset, and therefore, a minimum sub-carrier spacing of the OFDM system can be calculated based on 10 V max*fc/c, where V max represents a maximum movement velocity, fc represents carrier frequency, and c represents the velocity of light;

a guard interval of the first signal, for example, a maximum guard spacing, or a minimum guard spacing, or a guard spacing range; a time interval between the signal end sending time and the receiving time of a latest echo signal of the signal, where this parameter is directly proportional to a maximum sensing distance, and for example, may be calculated based on 2d max/c, where d max represents a maximum sensing distance, and for example, for a self-transmitting/self-receiving sensing signal, d max represents a maximum range from a sensing signal transmitting/receiving point to a signal transmitting point; in a certain case, an OFDM signal cyclic prefix (CP) achieves a function of a minimum guard spacing;

a bandwidth of the first signal; e.g., a maximum bandwidth or a minimum bandwidth or a bandwidth range, where this parameter is inversely proportional to the range resolution, and can be obtained based on c/2/delta_d, where delta_d represents the range resolution, and c represents the velocity of light;

a duration of the first signal, where this parameter is a time span of the first signal; e.g., a minimum duration or a maximum duration or a duration range, where this parameter is inversely proportional to the velocity resolution, and this parameter is a time span of the sensing signal, mainly for calculating a Doppler frequency offset; this parameter may be calculated based on c/2/delta_v/fc, where delta_v represents velocity resolution, fc represents carrier frequency, and c represents the velocity of light;

a time domain interval of the first signal, where this parameter is a time interval between two adjacent first signals, e.g., a maximum time domain interval or a minimum time domain interval or a time interval range; this parameter may be calculated based on c/2/fc/v_range, where v_range represents a maximum velocity minus a minimum velocity, fc represents carrier frequency, and c represents the velocity of light;

sending signal power of the first signal; e.g., a value taken every 2 dBm from −20 dBm to 23 dBm, where a second device may determine transmitted power based on a maximum sensing distance parameter indicated by a first message;

a signal format of the first signal; for example, information such as a sounding reference signal (SRS), a demodulation reference signal (DMRS), a positioning reference signal (PRS), or other predefined signals, and related sequence formats;

a signal direction of the first signal; e.g., a shift angle in a direction of the first signal by taking a line connecting a first device to a second device as a reference angle (e.g., for controlling a possible interference of the first signal on a neighboring cell);

a time resource of the first signal; e.g., a slot index where the first signal is located or a symbol index of a slot, where there are two types of time resources, one is a disposable time resource, for example, an omnidirectional first signal is sent by one symbol; the other one is a non-disposable time resource, such as a plurality of groups of periodic time resources or discontinuous time resources (which can include start time and end time); the first signal in a same direction is sent by each group of periodic time resources; and the beam directions on different groups of periodic time resources are different; or a frequency domain resource of the first signal, including a center frequency point of the first signal, a bandwidth, a resource block (RB) or a sub-carrier, and the like.

In at least one optional embodiment of this application, the second message may be sent through at least one of layer 1 signaling, a media access control control element (MAC CE), radio resource control (RRC) signaling, system information block (SIB) signaling, or master information block (MIB).

As at least one optional embodiment of this application, in a case that the second device cannot obtain, based on the indication of the first message, the configuration information meeting the sensing requirement, the second device may reject the sensing requirement of the first device and notifies the first device of a rejection message.

As at least one optional embodiment of this application, the second message includes:

the configuration information of the first signal, or, an index number, where the index number is associated with the configuration information of the first signal.

In other words, all or some of items indicated by the configuration information of the first signal may be jointly encoded; therefore, the second message only needs to carry an index number, where the index number is associated with the configuration information of the first signal. Details are shown in Table 4:

11

TABLE 4

| Index number | Configuration information of first signal |
| --- | --- |
| Index 1 | OFDM signal, having a sub-carrier spacing of 60 KHz, and a CP of a normal CP, or the like |
| Index 2 | OFDM signal, having a sub-carrier spacing of 60 KHz, and a CP of an extended CP, or the like |
| Index 3 | OTFS signal, having M and N in two-dimensional Fourier transform of respectively 16 and 1024 |
| . . . | . . . |

Optionally, after the second device sends the configuration information of the first signal to the first device and/or the third device, the method further includes:

The first device detects the first signal or an echo of the first signal, and obtains a measurement quantity related to sensing. The measurement quantity related to sensing includes at least one of the following:

a channel matrix;

channel state information;

power of each path in a multi-path channel;

a delay of each path in the multi-path channel;

an angle of each path in the multi-path channel;

information of a reflection point;

target radar scattering cross-section area information;

Doppler spread;

Doppler shift;

a phase difference between antennas; or a delay difference between antennas.

The measurement quantity includes: a measurement quantity based on each antenna, and/or a measurement quantity based on each sensing resource.

Optionally, the method further includes:

The first device based on the measurement quantity related to sensing, sensing result information related to sensing requirements of the first device.

Alternatively, the first device sends the measurement quantity related to sensing to a fourth device, such that the fourth device determines, based on the measurement quantity related to sensing, sensing result information related to a sensing requirement of the first device, and sends the sensing result information related to the sensing requirement of the first device to the first device.

It should be noted that the fourth device is a receiving/processing device of feedback information of the first signal, and a computing unit of a similar location management function (LMF), and may be a base station, a terminal, a device to device link sidelink device, a perception server, or the like, which are not limited herein. It should be noted that the fourth device may be an independently arranged device, or may be a unit attached to another device. For example, a fourth device may be configured on a first device, or may be configured on a second device, or may be configured on a third device.

For example, the sensing result information related to the sensing requirement of the first device includes at least one of the following: information such as an orientation, a distance, or a velocity of a target object, or results such as performing detection, tracking, identification, and imaging on the target object, an event, an environment, or the like.

In the embodiments of this application, a first device having a sensing requirement sends, through a first message, the sensing requirement to a second device, and the second device determines, based on the received sensing requirement, configuration information of a first signal and notifies a first signal sending device and/or a first signal receiving device, such that the first signal sending device and a first signal receiving device performs transmission of the first signal based on communications of the second device. In the embodiments of this application, configuration information of a first signal may be determined based on a sensing requirement, effectively meeting different sensing requirements of the first device. Moreover, because the second device uniformly determines the configuration information of the first signal, a problem of non-uniform rules of signal types and parameters caused by other devices determining a first signal is avoided.

As illustrated in FIG. 3, an embodiment of this application further provides a message transmission method, including:

Step 301: A first device sends a first message to a second device. The first message indicates at least one of the following:

a sensing resolution related requirement;

a sensing distance related requirement;

a sensing area related requirement;

a sensing object related requirement;

a sensing error related requirement;

a sensing signal quality related requirement; or a sensing delay related requirement.

In at least one optional embodiment of this application, the sensing resolution related requirement includes at least one of range resolution, velocity resolution, angular resolution, imaging resolution, temperature resolution, air pressure resolution, or humidity resolution. The sensing resolution related requirement further includes air quality related resolution or the like. For example, a range resolution requirement is 1 meter, a velocity resolution requirement is 1 Km per hour, an angular resolution requirement is 2 degrees, an imaging resolution requirement is 5 cm by 5 cm, temperature resolution is 1° C., or the like.

In at least one optional embodiment of this application, the sensing distance related requirement includes at least one of a maximum sensing distance or a sensing distance range.

In at least one optional embodiment of this application, the sensing signal quality related requirement includes at least one of received signal strength, a signal to noise ratio, a signal to interference plus noise ratio, a signal to clutter ratio, a signal sidelobe feature, or a peak to average power ratio (PAPR) of a sensing signal. For example, received signal strength of a sensing signal is greater than −80 dBm, a signal to noise ratio or signal to interference plus noise ratio requirement is greater than 5 dB, or a signal to clutter ratio requirement or a signal to clutter and noise ratio requirement is 10 dB. For another example, sidelobe signal strength of a sensing signal is lower than main lobe signal strength by 10 dB. The sensing signal quality related requirement may also be transmitted power of the sensing signal. For example, a first device may obtain a transmitted power requirement of a sensing signal based on estimated path loss between a second device and the first device and a received signal strength requirement of the sensing signal.

For example, a first device reports a PAPR requirement of a sensing signal to a second device. If the PAPR requirement is less strict, the second device configures, for the first device, a first signal based on orthogonal frequency-division multiplexing (OFDM). If the PAPR requirement is strict, the second device configures, for the first device, a sensing signal based on single-carrier frequency-division multiple access (SC-FDMA) or a first signal based on frequency modulated continuous wave (FMCW).

In at least one optional embodiment of this application, the sensing object related requirement includes a weather situation (temperature, humidity, or the like), an object of a traffic monitoring class such as a vehicle, crowd density, environment, terrain or building conditions, a gesture or an action of a human being, or the like.

In at least one optional embodiment of this application, the sensing area related requirement includes a specific area in the traffic monitoring class, a specific area associated with a 3D building scenario reconstructed by a sensing signal, or the like.

In at least one optional embodiment of this application, the sensing delay related requirement includes at least one of the following:

a sending time or a sending time window of a sensing signal; or a feedback time or a feedback time window of a measurement quantity associated with the sensing signal.

For example, after a first device sends a first message, the first device or a third device sends a time window of the first signal. Alternatively, after a second device receives a first message, a first device or a third device sends a time window of the first signal. Alternatively, a first device sends a first message and then obtains a time window for sensing information feedback.

It should be noted that in at least one embodiment of this application, content indicated by the first message may be sent by one first message, or by a plurality of first messages.

It should be noted that in the embodiments of this application, the first message may directly indicate a sensing related requirement, or may indirectly indicate a sensing related requirement by indicating a sensing type, where different sensing types are associated with different sensing related requirements.

As an optional embodiment of this application, the method further includes:

The first device receives a second message sent by the second device. The second message indicates configuration information of a first signal. The first signal is a signal used for sensing, or the first signal is a signal for integrated sensing and communication.

The first device sends the first signal based on the configuration information of the first signal.

Alternatively, the method further includes:

The first device receives a first signal sent by a third device based on configuration information of the first signal. The configuration information of the first signal is sent by the second device to the third device through a second message. The first signal is a signal used for sensing, or the first signal is a signal for integrated sensing and communication.

It should be noted that the first message mentioned in the embodiments of this application may also indicate sending the first signal by the first device, or sending the first signal by the third device. The second device sends, to a corresponding device, the configuration information of the first signal based on the indication of the first message.

The configuration information of the first signal indicates at least one of the following:

a waveform of the first signal; for example, the second device determines, based on the indication content of the first message, which one of signals such as OFDM, SC-FDMA, OTFS (OTFS), FMCW, and pulse signals the first signal is;

a sub-carrier spacing of the first signal; for example, a minimum sub-carrier spacing, or a maximum sub-carrier spacing, or a sub-carrier spacing range, where a minimum sub-carrier spacing of an OFDM system is generally configured to be obviously greater than a maximum Doppler frequency offset, and therefore, a minimum sub-carrier spacing of the OFDM system can be calculated based on 10 V max*fc/c, where V max represents a maximum movement velocity, fc represents carrier frequency, and c represents the velocity of light;

a guard interval of the first signal; for example, a maximum guard spacing, or a minimum guard spacing, or a guard spacing range; a time interval between the signal end sending time and the receiving time of a latest echo signal of the signal, where this parameter is directly proportional to a maximum sensing distance, and for example, may be calculated based on 2d max/c, where d max represents a maximum sensing distance, and for example, for a self-transmitting/self-receiving sensing signal, d max represents a maximum range from a sensing signal transmitting/receiving point to a signal transmitting point; in a certain case, an OFDM signal cyclic prefix CP achieves a function of a minimum guard spacing;

a bandwidth of the first signal; e.g., a maximum bandwidth or a minimum bandwidth or a bandwidth range, where this parameter is inversely proportional to the range resolution, and can be obtained based on c/2/delta_d, where delta_d represents the range resolution, and c represents the velocity of light;

a duration of the first signal; this parameter is a time span of the first signal; e.g., a minimum duration or a maximum duration or a duration range, where this parameter is inversely proportional to the velocity resolution, and this parameter is a time span of the sensing signal, mainly for calculating a Doppler frequency offset; this parameter may be calculated based on c/2/delta_v/fc, where delta_v represents velocity resolution, fc represents carrier frequency, and c represents the velocity of light;

a time domain interval of the first signal; this parameter is a time interval between two adjacent first signals, e.g., a maximum time domain interval or a minimum time domain interval or a time interval range; this parameter may be calculated based on c/2/fc/v_range, where v_range represents a maximum velocity minus a minimum velocity, fc represents carrier frequency, and c represents the velocity of light;

sending signal power of the first signal; e.g., a value taken every 2 dBm from −20 dBm to 23 dBm, where a second device may determine transmitted power based on a maximum sensing distance parameter indicated by a first message;

a signal format of the first signal; for example, information such as a sounding reference signal (SRS), a demodulation reference signal (DMRS), a positioning reference signal (PRS), or other predefined signals, and related sequence formats;

a signal direction of the first signal; e.g., a shift angle in a direction of the first signal by taking a line connecting a first device to a second device as a reference angle (e.g., for controlling a possible interference of the first signal on a neighboring cell);

a time resource of the first signal; and e.g., a slot index where the first signal is located or a symbol index of a slot, where there are two types of time resources, one is a disposable time resource, for example, an omnidirectional first signal is sent by one symbol; the other one is a non-disposable time resource, such as a plurality of groups of periodic time resources or discontinuous time resources (which can include start time and end time); the first signal in a same direction is sent by each group of periodic time resources; and the beam directions on different groups of periodic time resources are different; or a frequency domain resource of the first signal, including a center frequency point of the first signal, a bandwidth, a resource block (RB) or a sub-carrier, and the like.

In at least one optional embodiment of this application, the second message may be sent through at least one of layer 1 signaling, a media access control control element (MAC CE), radio resource control (RRC) signaling, system information block (SIB) signaling, or master information block (MIB).

As at least one optional embodiment of this application, in a case that the second device cannot obtain, based on the indication of the first message, the configuration information meeting the sensing requirement, the second device may reject the sensing requirement of the first device and notifies the first device of a rejection message.

As at least one optional embodiment of this application, the second message includes:

the configuration information of the first signal, or, an index number, where the index number is associated with the configuration information of the first signal. In other words, all or some of items indicated by the configuration information of the first signal may be jointly encoded; therefore, the second message only needs to carry an index number, where the index number is associated with the configuration information of the first signal.

In at least one embodiment of this application, the method may further include:

The first device detects the first signal or an echo of the first signal, and obtains a measurement quantity related to sensing. The measurement quantity related to sensing includes at least one of the following:

a channel matrix;

channel state information;

power of each path in a multi-path channel;

a delay of each path in the multi-path channel;

an angle of each path in the multi-path channel;

information of a reflection point;

target radar scattering cross-section area information;

Doppler spread;

Doppler shift;

a phase difference between antennas; or a delay difference between antennas.

The measurement quantity includes: a measurement quantity based on each antenna, and/or a measurement quantity based on each sensing resource.

Optionally, the method further includes:

The first device determines, based on the measurement quantity related to sensing, sensing result information related to sensing requirements of the first device.

Alternatively, the method further includes:

The first device sends the measurement quantity related to sensing to a fourth device, such that the fourth device determines, based on the measurement quantity related to sensing, sensing result information related to sensing requirements of the first device.

The first device receives the sensing result information related to the sensing requirements of the first device sent by the fourth device.

For example, the sensing result information related to the sensing requirement of the first device includes at least one of the following: information such as an orientation, a distance, or a velocity of a target object, or results such as performing detection, tracking, identification, and imaging on the target object, an event, an environment, or the like.

In the embodiments of this application, a first device having a sensing requirement sends, through a first message, the sensing requirement to a second device, and the second device determines, based on the received sensing requirement, configuration information of a first signal and notifies a first signal sending device and/or a first signal receiving device, such that the first signal sending device and a first signal receiving device performs transmission of the first signal based on communications of the second device. In the embodiments of this application, configuration information of a first signal may be determined based on a sensing requirement, effectively meeting different sensing requirements of the first device. Moreover, because the second device uniformly determines the configuration information of the first signal, a problem of non-uniform rules of signal types and parameters caused by other devices determining a first signal is avoided.

As shown in FIG. 4, an embodiment of this application further provides a signal sending method, including:

Step 401: A third device receives a second message sent by a second device. The second message indicates configuration information of a first signal. The first signal is a signal used for sensing, or the first signal is a signal for integrated sensing and communication.

Step 402: The third device sends a first signal based on configuration information of the first signal.

It should be noted that the second message is a second message sent after the second device receives the first message sent by the first device. The first message indicates at least one of the following:

a sensing resolution related requirement;

a sensing distance related requirement;

a sensing area related requirement;

a sensing object related requirement;

a sensing error related requirement;

a sensing signal quality related requirement; or a sensing delay related requirement.

In the embodiment of this application, the first device is a device having the sensing requirement, and may be a base station, a terminal, a device to device link sidelink device, a perception server, or the like. The second device is a control device of the first signal, and a computing unit of a similar location management function (LMF), and may be a base station, a terminal, a device to device link sidelink device, a perception server, or the like.

It should be noted that the second device may be an independently arranged device, or may be a unit attached to another device. For example, a second device may be configured on a first device, or may be configured on a third device.

In at least one embodiment of this application, the configuration information of the first signal indicates at least one of the following:

a waveform of the first signal; for example, the second device determines, based on the indication content of the first message, which one of signals such as OFDM, SC-FDMA, OTFS (OTFS), FMCW, and pulse signals the first signal is;

a sub-carrier spacing of the first signal; for example, a minimum sub-carrier spacing, or a maximum sub-carrier spacing, or a sub-carrier spacing range, where a minimum sub-carrier spacing of an OFDM system is generally configured to be obviously greater than a maximum Doppler frequency offset, and therefore, a minimum sub-carrier spacing of the OFDM system can be calculated based on 10 V max*fc/c, where V max represents a maximum movement velocity, fc represents carrier frequency, and c represents the velocity of light;

a guard interval of the first signal; for example, a maximum guard spacing, or a minimum guard spacing, or a guard spacing range; a time interval between the signal end sending time and the receiving time of a latest echo signal of the signal, where this parameter is directly proportional to a maximum sensing distance, and for example, may be calculated based on 2d max/c, where d max represents a maximum sensing distance, and for example, for a self-transmitting/self-receiving sensing signal, d max represents a maximum range from a sensing signal transmitting/receiving point to a signal transmitting point; in a certain case, an OFDM signal cyclic prefix CP achieves a function of a minimum guard spacing;

a bandwidth of the first signal; e.g., a maximum bandwidth or a minimum bandwidth or a bandwidth range, where this parameter is inversely proportional to the range resolution, and can be obtained based on c/2/delta_d, where delta_d represents the range resolution, and c represents the velocity of light;

a duration of the first signal; this parameter is a time span of the first signal; e.g., a minimum duration or a maximum duration or a duration range, where this parameter is inversely proportional to the velocity resolution, and this parameter is a time span of the sensing signal, mainly for calculating a Doppler frequency offset; this parameter may be calculated based on c/2/delta_v/fc, where delta_v represents velocity resolution, fc represents carrier frequency, and c represents the velocity of light;

a time domain interval of the first signal; this parameter is a time interval between two adjacent first signals, e.g., a maximum time domain interval or a minimum time domain interval or a time interval range; this parameter may be calculated based on c/2/fc/v_range, where v_range represents a maximum velocity minus a minimum velocity, fc represents carrier frequency, and c represents the velocity of light;

sending signal power of the first signal; e.g., a value taken every 2 dBm from −20 dBm to 23 dBm, where a second device may determine transmitted power based on a maximum sensing distance parameter indicated by a first message;

a signal format of the first signal; for example, information such as a sounding reference signal (SRS), a demodulation reference signal (DMRS), a positioning reference signal (PRS), or other predefined signals, and related sequence formats;

a signal direction of the first signal; e.g., a shift angle in a direction of the first signal by taking a line connecting a first device to a second device as a reference angle (e.g., for controlling a possible interference of the first signal on a neighboring cell);

a time resource of the first signal; and e.g., a slot index where the first signal is located or a symbol index of a slot, where there are two types of time resources, one is a disposable time resource, for example, an omnidirectional first signal is sent by one symbol; the other one is a non-disposable time resource, such as a plurality of groups of periodic time resources or discontinuous time resources (which can include start time and end time); the first signal in a same direction is sent by each group of periodic time resources; and the beam directions on different groups of periodic time resources are different; or a frequency domain resource of the first signal, including a center frequency point of the first signal, a bandwidth, a resource block (RB) or a sub-carrier, and the like.

As at least one optional embodiment of this application, the second message includes:

the configuration information of the first signal, or, an index number, where the index number is associated with the configuration information of the first signal.

In other words, all or some of items indicated by the configuration information of the first signal may be jointly encoded; therefore, the second message only needs to carry an index number, where the index number is associated with the configuration information of the first signal.

In the embodiments of this application, a first device having a sensing requirement sends, through a first message, the sensing requirement to a second device, and the second device determines, based on the received sensing requirement, configuration information of a first signal and notifies a first signal sending device and/or a first signal receiving device, such that the first signal sending device and a first signal receiving device performs transmission of the first signal based on communications of the second device. In the embodiments of this application, configuration information of a first signal may be determined based on a sensing requirement, effectively meeting different sensing requirements of the first device. Moreover, because the second device uniformly determines the configuration information of the first signal, a problem of non-uniform rules of signal types and parameters caused by other devices determining a first signal is avoided.

It should be noted that the execution main body of the method provided in the embodiment of this application may be an apparatus or a control module in the apparatus for executing the method. The following describes the apparatus provided in the embodiment of this application by taking the apparatus executing the method as an example.

As shown in FIG. 5, an embodiment of this application further provides a message transmission apparatus 500, applied to a second device and including:

a first receiving module 501, configured to receive a first message sent by a first device. The first message indicates at least one of the following:

a sensing resolution related requirement;

a sensing distance related requirement;

a sensing area related requirement;

a sensing object related requirement;

a sensing error related requirement;

a sensing signal quality related requirement; or a sensing delay related requirement.

As one optional embodiment, the sensing resolution related requirement includes at least one of range resolution, velocity resolution, angular resolution, imaging resolution, temperature resolution, air pressure resolution, or humidity resolution.

As one optional embodiment, the sensing distance related requirement includes at least one of a maximum sensing distance or a sensing distance range.

As one optional embodiment, the sensing signal quality related requirement includes at least one of received signal strength, a signal to noise ratio, a signal to interference plus noise ratio, a signal to clutter ratio, a signal sidelobe feature, or a peak to average power ratio (PAPR) of a sensing signal.

As one optional embodiment, the sensing delay related requirement includes at least one of the following:

a sending time or a sending time window of a sensing signal; or a feedback time or a feedback time window of a measurement quantity associated with the sensing signal.

As one optional embodiment, the apparatus further includes:

a first determining module, configured to determine configuration information of a first signal. The first signal is a signal used for sensing, or the first signal is a signal for integrated sensing and communication.

As one optional embodiment, the apparatus further includes:

a first sending module, configured to send a second message to the first device and/or a third device. The second message indicates configuration information of a first signal, such that the first device or the third device sends the first signal based on the configuration information of the first signal.

The first signal is a signal used for sensing, or the first signal is a signal for integrated sensing and communication.

As one optional embodiment, the configuration information of the first signal indicates at least one of the following:

a waveform of the first signal;

a sub-carrier spacing of the first signal;

a guard interval of the first signal;

a bandwidth of the first signal;

a duration of the first signal;

a time domain interval of the first signal;

sending signal power of the first signal;

a signal format of the first signal;

a signal direction of the first signal;

a time resource of the first signal; or a frequency domain resource of the first signal.

As one optional embodiment, the second message includes:

the configuration information of the first signal, or, an index number, where the index number is associated with the configuration information of the first signal.

In the embodiments of this application, a first device having a sensing requirement sends, through a first message, the sensing requirement to a second device, and the second device determines, based on the received sensing requirement, configuration information of a first signal and notifies a first signal sending device and/or a first signal receiving device, such that the first signal sending device and a first signal receiving device performs transmission of the first signal based on communications of the second device. In the embodiments of this application, configuration information of a first signal may be determined based on a sensing requirement, effectively meeting different sensing requirements of the first device. Moreover, because the second device uniformly determines the configuration information of the first signal, a problem of non-uniform rules of signal types and parameters caused by other devices determining a first signal is avoided.

It should be noted that the message transmission apparatus provided in the embodiment of this application is an apparatus capable of executing the message transmission method; therefore, all embodiments of the message transmission method are applicable to the apparatus, and can achieve the same or similar beneficial effects.

As illustrated in FIG. 6, an embodiment of this application further provides a message transmission apparatus 600, applied to a first device. The apparatus includes:

a second sending module 601, configured to send a first message to a second device. The first message indicates at least one of the following:

a sensing resolution related requirement;

a sensing distance related requirement;

a sensing area related requirement;

a sensing object related requirement;

a sensing error related requirement;

a sensing signal quality related requirement; or a sensing delay related requirement.

As one optional embodiment, the sensing resolution related requirement includes at least one of range resolution, velocity resolution, angular resolution, imaging resolution, temperature resolution, air pressure resolution, or humidity resolution.

As one optional embodiment, the sensing distance related requirement includes at least one of a maximum sensing distance or a sensing distance range.

As one optional embodiment, the sensing signal quality related requirement includes at least one of received signal strength, a signal to noise ratio, a signal to interference plus noise ratio, a signal to clutter ratio, a signal sidelobe feature, or a peak to average power ratio (PAPR) of a sensing signal.

As one optional embodiment, the sensing delay related requirement includes at least one of the following:

a sending time or a sending time window of a sensing signal; or a feedback time or a feedback time window of a measurement quantity associated with the sensing signal.

As one optional embodiment, the apparatus further includes:

a second receiving module, configured to receive a second message sent by the second device, where the second message indicates configuration information of a first signal, and the first signal is a signal used for sensing, or the first signal is a signal for integrated sensing and communication; and a third sending module, configured to send the first signal based on the configuration information of the first signal.

As one optional embodiment, the apparatus further includes:

a third receiving module, configured to receive a first signal that is sent by a third device based on configuration information of the first signal. The configuration information of the first signal is sent by the second device to the third device through a second message. The first signal is a signal used for sensing, or the first signal is a signal for integrated sensing and communication.

As one optional embodiment, the configuration information of the first signal indicates at least one of the following:

a waveform of the first signal;

a sub-carrier spacing of the first signal;

a guard interval of the first signal;

a bandwidth of the first signal;

a duration of the first signal;

a time domain interval of the first signal;

sending signal power of the first signal;

a signal format of the first signal;

a signal direction of the first signal;

a time resource of the first signal; or a frequency domain resource of the first signal.

As one optional embodiment, the second message includes:

the configuration information of the first signal, or, an index number, where the index number is associated with the configuration information of the first signal.

As one optional embodiment, the apparatus further includes:

an obtaining module, configured to detect the first signal or an echo of the first signal, and obtain a measurement quantity related to sensing. The measurement quantity related to sensing includes at least one of the following:

a channel matrix;

channel state information;

power of each path in a multi-path channel;

a delay of each path in the multi-path channel;

an angle of each path in the multi-path channel;

information of a reflection point;

target radar scattering cross-section area information;

Doppler spread;

Doppler shift;

a phase difference between antennas; or a delay difference between antennas.

As one optional embodiment, the measurement quantity includes: a measurement quantity based on each antenna, and/or a measurement quantity based on each sensing resource.

As one optional embodiment, the apparatus further includes:

a second determining module, configured to determine, based on the measurement quantity related to sensing, sensing result information related to sensing requirements of the first device.

As one optional embodiment, the apparatus further includes:

a measurement quantity sending module, configured to send the measurement quantity related to sensing to a fourth device, such that the fourth device determines, based on the measurement quantity related to sensing, sensing result information related to sensing requirements of the first device; and a result receiving module, configured to receive the sensing result information related to the sensing requirements of the first device sent by the fourth device.

In the embodiments of this application, a first device having a sensing requirement sends, through a first message, the sensing requirement to a second device, and the second device determines, based on the received sensing requirement, configuration information of a first signal and notifies a first signal sending device and/or a first signal receiving device, such that the first signal sending device and a first signal receiving device performs transmission of the first signal based on communications of the second device. In the embodiments of this application, configuration information of a first signal may be determined based on a sensing requirement, effectively meeting different sensing requirements of the first device. Moreover, because the second device uniformly determines the configuration information of the first signal, a problem of non-uniform rules of signal types and parameters caused by other devices determining a first signal is avoided.

It should be noted that the message transmission apparatus provided in the embodiment of this application is an apparatus capable of executing the message transmission method; therefore, all embodiments of the message transmission method are applicable to the apparatus, and can achieve the same or similar beneficial effects.

As shown in FIG. 7, an embodiment of this application further provides a signal sending apparatus 700, applied to a third device and including:

a fourth receiving module 701, configured to receive a second message sent by the second device, where the second message indicates configuration information of a first signal, and the first signal is a signal used for sensing, or the first signal is a signal for integrated sensing and communication; and a fourth sending module 702, configured to send the first signal based on the configuration information of the first signal.

As one optional embodiment, the configuration information of the first signal indicates at least one of the following:

a waveform of the first signal;

a sub-carrier spacing of the first signal;

a guard interval of the first signal;

a bandwidth of the first signal;

a duration of the first signal;

a time domain interval of the first signal;

sending signal power of the first signal;

a signal format of the first signal;

a signal direction of the first signal;

a time resource of the first signal; or a frequency domain resource of the first signal.

As one optional embodiment, the second message includes:

the configuration information of the first signal, or, an index number, where the index number is associated with the configuration information of the first signal.

In the embodiments of this application, a first device having a sensing requirement sends, through a first message, the sensing requirement to a second device, and the second device determines, based on the received sensing requirement, configuration information of a first signal and notifies a first signal sending device and/or a first signal receiving device, such that the first signal sending device and a first signal receiving device performs transmission of the first signal based on communications of the second device. In the embodiments of this application, configuration information of a first signal may be determined based on a sensing requirement, effectively meeting different sensing requirements of the first device. Moreover, because the second device uniformly determines the configuration information of the first signal, a problem of non-uniform rules of signal types and parameters caused by other devices determining a first signal is avoided.

It should be noted that the signal sending apparatus provided in the embodiment of this application is an apparatus capable of executing the signal sending method; therefore, all embodiments of the signal sending method are applicable to the apparatus, and can achieve the same or similar beneficial effects.

The message transmission apparatus or the signal sending apparatus in the embodiment of this application may be an apparatus, an apparatus having an operating system or an electronic device, or a component in a terminal, an integrated circuit, or a chip. The apparatus or the electronic device may be a mobile terminal or a non-mobile terminal. Exemplarily, the mobile terminal includes, but is not limited to the type of the terminal 11 listed above, and the non-mobile terminal is a server, a network attached storage (NAS), a personal computer (PC), a television (TV), a teller machine or a self-service machine, and the like, which is not limited in the embodiment of this application.

The message transmission apparatus or the signal sending apparatus provided in the embodiment of this application can implement all processes implemented by method embodiments in FIG. 1 to FIG. 4, and can achieve the same technical effects. To avoid repetition, no detailed description is provided herein.

Figures 8, 9:
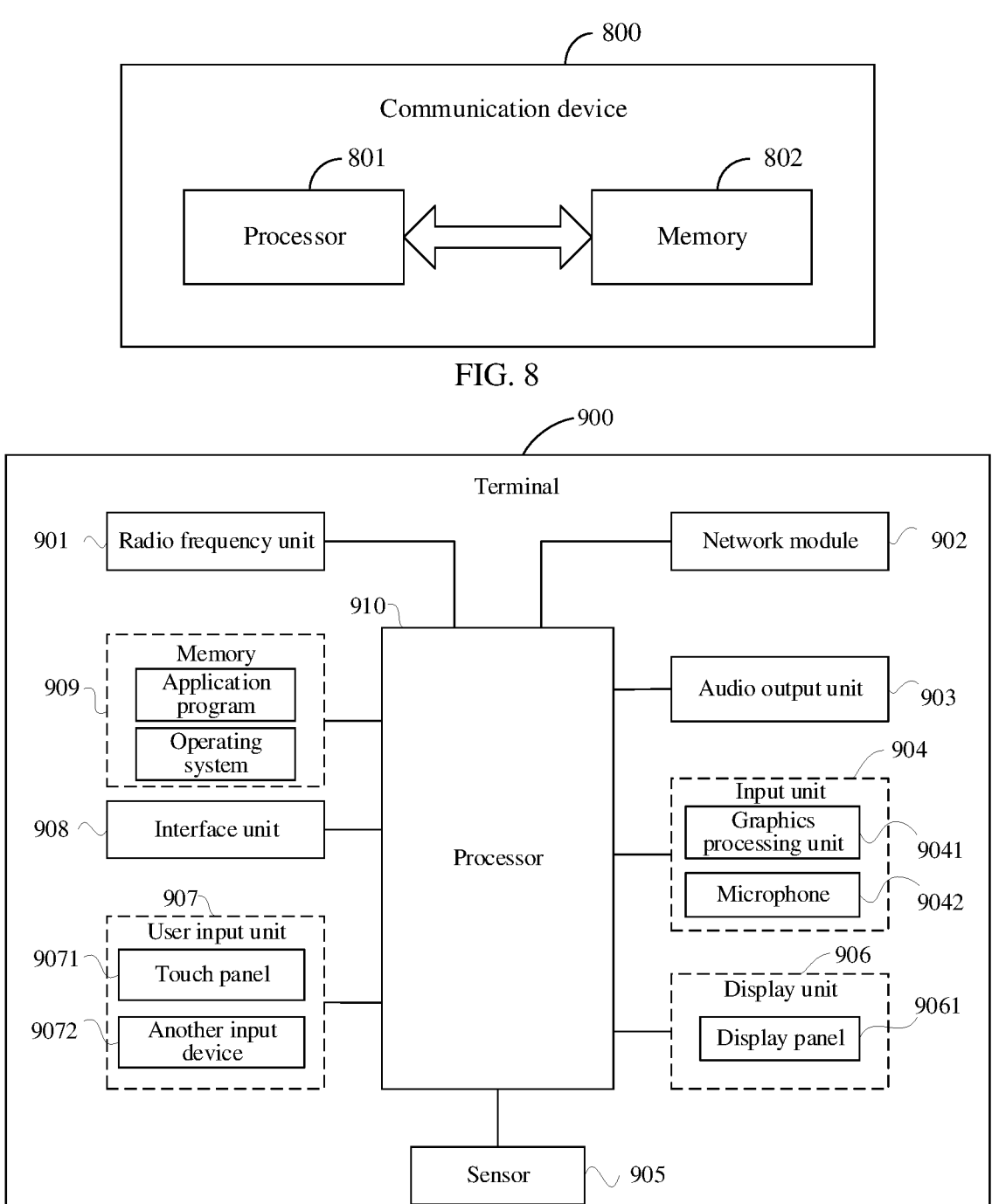
FIG. 8 is a schematic diagram of a structure of a communication device according to an embodiment of this application.
FIG. 9 is a schematic diagram of a structure of a terminal according to an embodiment of this application.

Optionally, as shown in FIG. 8, the embodiment of this application also provides a communication device 800, including a processor 801, a memory 802, and a program or instructions stored on the memory 802 and executable on the processor 801, where when the program or the instructions are executed by the processor 801, the processes of the method embodiments are implemented, and the same technical effects can be achieved. To avoid repetition, details are not described herein again.

The embodiments of this application further provide a communication device. The communication device is a first device, or a second device, or a third device, and includes a processor and a communication interface. The communication interface is configured to receive a first message sent by a first device, or the communication interface is configured to send a first message to a second device. The first message indicates at least one of the following: a sensing resolution related requirement; a sensing distance related requirement; a sensing area related requirement; a sensing object related requirement; a sensing error related requirement; a sensing signal quality related requirement; or a sensing delay related requirement. Alternatively, the communication interface is configured to receive a second message sent by a second device. The second message indicates configuration information of a first signal. The first signal is a signal used for sensing, or the first signal is a signal for integrated sensing and communication. The processor is configured to send, through the communication interface, the first signal based on the configuration information of the first signal. The communication device embodiment corresponds to the communication device-side method embodiment. The implementation processes and implementation modes of the method embodiment are all applicable to the terminal embodiment, and can achieve the same technical effects. In a case that the communication device is a terminal, optionally, FIG. 9 is a schematic diagram of a structure of hardware of a terminal according to an embodiment of this application.

The terminal 900 includes, but is not limited to: at least some components such as a radio frequency unit 901, a network module 902, an audio output unit 903, an input unit 904, a sensor 905, a display unit 906, a user input unit 907, an interface unit 908, a memory 909, and a processor 910.

A person skilled in the art may understand that the terminal 900 may further include power supplies (such as a battery) for supplying power to the components. The power supply may be logically connected to the processor 910 through a power management system, thereby implementing functions such as charging, discharging, and power consumption management through the power management system. The terminal structure shown in FIG. 9 does not constitute a limitation on the terminal, and the terminal may include more or fewer components than shown, or combine some components, or have different component arrangements. Details are not described herein again.

In the embodiment of this application, it is to be understood that the input unit 904 may include a graphics processing unit (GPU) 9041 and a microphone 9042. The graphics processing unit 9041 performs processing on image data of a static picture or a video that is obtained by an image capture apparatus (for example, a camera) in a video capture mode or an image capture mode. The display unit 906 may include a display panel 9061. The display panel 9061 may be configured in the form of a liquid crystal display, an organic light-emitting diode, or the like. The user input unit 907 includes a touch panel 9071 and another input device 9072. The touch panel 9071 is also referred to as a touch screen. The touch panel 9071 may include two parts: a touch detection apparatus and a touch controller. The another input device 9072 may include, but not limited to, a physical keyboard, a functional key (such as a volume control key or a switch key), a track ball, a mouse, and a joystick, which are not described herein in detail.

In the embodiment of this application, after receiving downlink data from a network-side device, the radio frequency unit 901 sends the downlink data to the processor 910 for processing. In addition, uplink data is sent to the network-side device. Generally, the radio frequency unit 901 includes, but is not limited to, an antenna, at least one amplifier, a transceiver, a coupler, a low noise amplifier, a duplexer, and the like.

The memory 909 is configured to store a software program or instructions and various data. The memory 909 may mainly include a program or instructions storage area and a data storage area. The program or instructions storage area may store an operating system, an application or instruction required by at least one function (for example, a sound playback function and an image display function), and the like. In addition, the memory 909 may include a high-speed random access memory, or a non-volatile memory. The non-volatile memory may be a read-only memory (ROM), a programmable read-only memory (PROM), an erasable programmable read-only memory (EPROM), an electrically erasable programmable read-only memory (EEPROM) or a flash memory. The non-volatile memory is, for example, at least one magnetic disk storage device, a flash memory or another volatile solid-state storage device.

The processor 910 may include one or more processing units. Optionally, the processor 910 may integrate an application processor and a modem processor, where the application processor mainly processes an operating system, a user interface, an application or instruction, and the like, and the modem processor mainly processes wireless communication, and is, for example, a baseband processor. It is to be understood that the foregoing modem may alternatively not be integrated into the processor 910.

The radio frequency unit 901 is configured to receive a first message sent by a first device. The first message indicates at least one of the following:

a sensing resolution related requirement;

a sensing distance related requirement;

a sensing area related requirement;

a sensing object related requirement;

a sensing error related requirement;

a sensing signal quality related requirement; or a sensing delay related requirement.

Alternatively, the radio frequency unit 901 is further configured to send a first message to a second device. The first message indicates at least one of the following:

a sensing resolution related requirement;

a sensing distance related requirement;

a sensing area related requirement;

a sensing object related requirement;

a sensing error related requirement;

a sensing signal quality related requirement; or a sensing delay related requirement.

Alternatively, the radio frequency 901 is further configured to receive a second message sent by a second device, where the second message indicates configuration information of a first signal, and the first signal is a signal used for sensing, or the first signal is a signal for integrated sensing and communication; and send the first signal based on the configuration information of the first signal.

Figure 10:
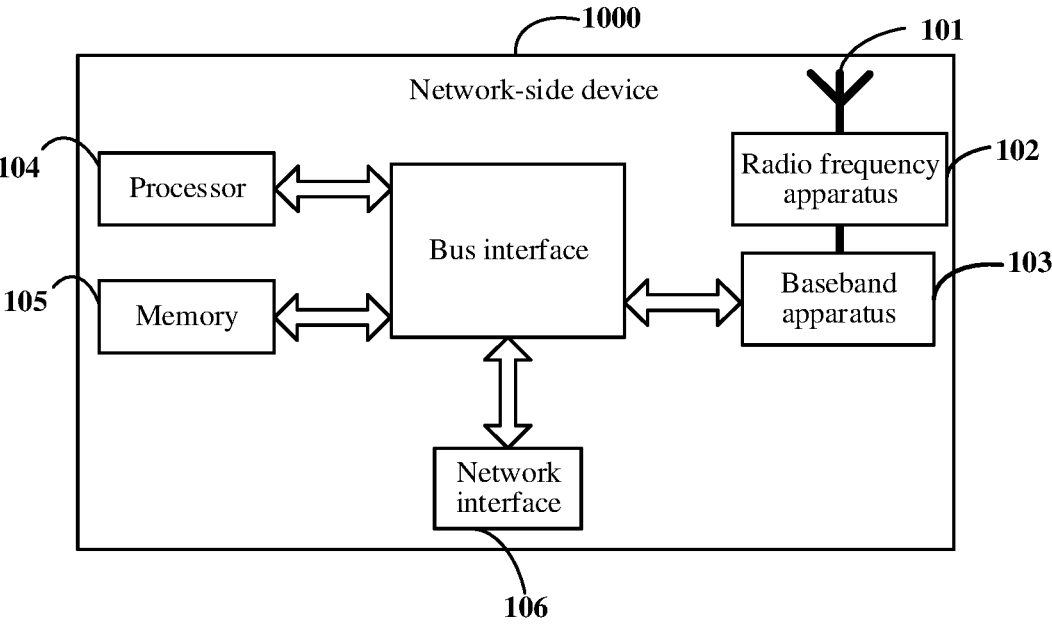
FIG. 10 is a schematic diagram of a structure of a network-side device according to an embodiment of this application.

In a case that the communication device is a network-side device, as shown in FIG. 10, the network-side device 1000 includes: an antenna 101, a radio frequency apparatus 102, and a baseband apparatus 103. The antenna 101 is connected to the radio frequency apparatus 102. In an uplink direction, the radio frequency apparatus 102 receives information through the antenna 101, and sends the received information to the baseband apparatus 103 for processing. In a downlink direction, the baseband apparatus 103 processes information to be sent, and sends same to the radio frequency apparatus 102, and the radio frequency apparatus 102 processes the received information, and then sends same through the antenna 101.

The frequency band processing apparatus may be located in the baseband apparatus 103. The method executed by the network-side device in the embodiment above may be implemented in the baseband apparatus 103. The baseband apparatus 103 includes a processor 104 and a memory 105.

The baseband apparatus 103 may include, for example, at least one baseband board. The baseband board is provided with a plurality of chips. As shown in FIG. 10, one of the chips is, for example, a processor 104, which is connected to the memory 105 to call a program in the memory 105 for implementing the operations of the network device shown in the method embodiments.

The baseband apparatus 103 may further include a network interface 106, configured to interact information with the radio frequency apparatus 102. The interface is, for example, a common public radio interface (CPRI).

Optionally, the network-side device in the embodiments of the present disclosure further includes: an instruction or program stored on the memory 105 and executable on the processor 104. The processor 104 calls the instruction or program in the memory 105 to execute the method executed by the modules shown in FIG. 10 and can achieve the same technical effects. To avoid repetition, no detailed description is provided herein.

The embodiment of this application further provides a non-transitory readable storage medium, storing a program or instructions, where when the program or the instructions are executed by a processor, the processes of the message transmission method or signal sending method embodiments are implemented, and the same technical effects can be achieved. To avoid repetition, no detailed description is provided herein.

The processor is a processor in the terminal in the foregoing embodiments. The non-transitory readable storage medium includes a non-transitory computer readable storage medium, for example, a computer read-only memory (ROM), a random access memory (RAM), a magnetic disk, or an optical disc.

The embodiments of this application further provides a chip. The chip includes a processor and a communication interface. The communication interface is coupled to the processor. The processor is configured to run a program or instructions to implement the processes of the message transmission method or signal sending method embodiments, and can achieve the same technical effects. To avoid repetition, no detailed description is provided herein.

The embodiments of this application further provide a computer program product. The program product is stored in a storage medium. The program product is implemented by at least one processor to implement the processes of the embodiment of the message transmission method or the signal sending method, and can achieve the same technical effects. To avoid repetition, details are not described herein again.

It should be understood that the chip provided in the embodiment of this application may also be referred to as a system on a chip, a system chip, a chip system, a system chip on a chip, and the like.

It should be noted that the terms "including", "comprising" or any other variants thereof in this application are intended to cover non-exclusive inclusion, so that a process, method, article or apparatus including a series of elements not only includes those elements, but also includes other elements that are not explicitly listed, or elements inherent to the process, method, article or apparatus. Without more limitations, the element defined by the sentence "including a . . . " does not exclude the existence of other identical elements in the process, method, article or apparatus including the element. In addition, it needs to be pointed out that in ranges of the method and apparatus in the embodiments of this application, functions are executed not based on the shown or discussed sequence, including based on a basically simultaneous manner in accordance with involved functions or an opposite sequence. For example, the described method is executed based on a sequence different from the described sequence, and steps may be added, omitted or combined. In addition, features described with reference to some examples may be combined in other examples.

Based on the descriptions of the embodiments, a person skilled in the art can clearly understand that the method in the embodiment can be implemented by means of software plus a necessary general hardware platform, or certainly by means of software. Based on such an understanding, the technical solutions in this application essentially, or a part contributing to the prior art may be implemented in a form of a software product. The computer software product is stored in a storage medium (such as a ROM/RAM, a floppy disk, and an optical disk), and includes a plurality of instructions for instructing one terminal (which may be a mobile phone, a computer, a server, an air conditioner, or a network device or the like) to perform the method in embodiments of this application.

The embodiments of this application have been described above with reference to the accompanying drawings. However, this application is not limited to the embodiments described above, and the embodiments described above are merely exemplary and not limitative. A person skilled in the art may make various variations under the teaching of this application without departing from the spirit of this application and the scope of protection of the claims, and such variations shall all fall within the scope of protection of this application.

What is claimed is:

1. A message transmission method, comprising:
receiving, by a second device, a first message sent by a first device, wherein the first message indicates at least one of:
a sensing resolution related requirement;
a sensing distance related requirement;
a sensing area related requirement;
a sensing object related requirement;
a sensing error related requirement;
a sensing signal quality related requirement; or
a sensing delay related requirement;

determining, by the second device, configuration information of a first signal based on indication of the first message; and sending, by the second device, a second message to the first device and/or a third device, wherein the second message indicates the configuration information of the first signal, such that the first device or the third device sends the first signal based on the configuration information of the first signal, and the first signal is a signal used for sensing, or the first signal is a signal for integrated sensing and communication.

2. The method according to claim 1, wherein the sensing resolution related requirement comprises at least one of range resolution, velocity resolution, angular resolution, imaging resolution, temperature resolution, air pressure resolution, or humidity resolution; or the sensing distance related requirement comprises at least one of a maximum sensing distance or a sensing distance range; or the sensing signal quality related requirement comprises at least one of received signal strength, a signal to noise ratio, a signal to interference plus noise ratio, a signal to clutter ratio, a signal sidelobe feature, or a peak to average power ratio (PAPR) of a sensing signal; or the sensing delay related requirement comprises at least one of:

a sending time or a sending time window of a sensing signal; or a feedback time or a feedback time window of a measurement quantity associated with the sensing signal.

3. The method according to claim 1, wherein the configuration information of the first signal indicates at least one of:

a waveform of the first signal;
a sub-carrier spacing of the first signal;
a guard interval of the first signal;
a bandwidth of the first signal;
a duration of the first signal;
a time domain interval of the first signal;
sending signal power of the first signal;
a signal format of the first signal;
a signal direction of the first signal;
a time resource of the first signal; or
a frequency domain resource of the first signal.

4. The method according to claim 1, wherein the second message comprises:

the configuration information of the first signal,
or,
an index number, wherein the index number is associated with the configuration information of the first signal.

5. A communication device, comprising a processor, a memory, and a program or instructions stored in the memory and executable on the processor, wherein when the program or the instructions are executed by the processor, steps of the message transmission method according to claim 1 are implemented.

6. The method according to claim 1, wherein the first message further indicates sending the first signal by the first device, or sending the first signal by the third device;

the sending, by the second device, the second message to the first device and/or the third device comprises:

sending, by the second device, the second message to the first device or the third device based on the indication of the first message.

7. A message transmission method, comprising:

sending, by a first device, a first message to a second device, wherein the first message indicates at least one of:

a sensing resolution related requirement;
a sensing distance related requirement;
a sensing area related requirement;
a sensing object related requirement;
a sensing error related requirement;
a sensing signal quality related requirement; or
a sensing delay related requirement;

receiving, by the first device, a second message sent by the second device, wherein the second message indicates configuration information of a first signal, the configuration information of the first signal is determined by the second device based on indication of the first message, and the first signal is a signal used for sensing, or the first signal is a signal for integrated sensing and communication; and sending, by the first device, the first signal based on the configuration information of the first signal.

8. The method according to claim 7, wherein the sensing resolution related requirement comprises at least one of range resolution, velocity resolution, angular resolution, imaging resolution, temperature resolution, air pressure resolution, or humidity resolution; or the sensing distance related requirement comprises at least one of a maximum sensing distance or a sensing distance range; or the sensing signal quality related requirement comprises at least one of received signal strength, a signal to noise ratio, a signal to interference plus noise ratio, a signal to clutter ratio, a signal sidelobe feature, or a peak to average power ratio (PAPR) of a sensing signal; or the sensing delay related requirement comprises at least one of:

a sending time or a sending time window of a sensing signal; or a feedback time or a feedback time window of a measurement quantity associated with the sensing signal.

9. The method according to claim 7, further comprising:

receiving, by the first device, the first signal that is sent by a third device based on configuration information of the first signal, wherein the configuration information of the first signal is sent by the second device to the third device through the second message.

10. The method according to claim 7, wherein the configuration information of the first signal indicates at least one of:

a waveform of the first signal;
a sub-carrier spacing of the first signal;
a guard interval of the first signal;
a bandwidth of the first signal;
a duration of the first signal;
a time domain interval of the first signal;
sending signal power of the first signal;
a signal format of the first signal;
a signal direction of the first signal;
a time resource of the first signal; or
a frequency domain resource of the first signal.

11. The method according to claim 7, wherein the second message comprises:

the configuration information of the first signal,
or,
an index number, wherein the index number is associated with the configuration information of the first signal.

12. The method according to claim 7, further comprising:

detecting, by the first device, the first signal or an echo of the first signal, and obtaining a measurement quantity related to sensing, wherein the measurement quantity related to sensing comprises at least one of:

a channel matrix;

channel state information;

power of each path in a multi-path channel;

a delay of each path in the multi-path channel;

an angle of each path in the multi-path channel;

information of a reflection point;

target radar scattering cross-section area information;

Doppler spread;

Doppler shift;

a phase difference between antennas; or a delay difference between antennas.

13. The method according to claim 12, further comprising:

determining, by the first device based on the measurement quantity related to sensing, sensing result information related to sensing requirements of the first device;

or, sending, by the first device, the measurement quantity related to sensing to a fourth device, such that the fourth device determines, based on the measurement quantity related to sensing, sensing result information related to sensing requirements of the first device; and receiving, by the first device, the sensing result information related to the sensing requirements of the first device sent by the fourth device.

14. A communication device, comprising a processor, a memory, and a program or instructions stored in the memory and executable on the processor, wherein when the program or the instructions are executed by the processor, steps of the message transmission method according to claim 7 are implemented.

15. The method according to claim 7, wherein the first message further indicates sending the first signal by the first device, or sending the first signal by the third device;

the receiving, by the first device, the second message sent by the second device comprises:

receiving, by the first device, the second message sent by the second device based on the indication of the first message.

16. A signal sending method, comprising:

receiving, by a third device, a second message sent by a second device, wherein the second message indicates configuration information of a first signal, the configuration information of the first signal is determined by the second device based on indication of a first message received from a first device, and the first signal is a signal used for sensing, or the first signal is a signal for integrated sensing and communication; and sending, by the third device, the first signal based on the configuration information of the first signal;

wherein the first message indicates at least one of:

a sensing resolution related requirement;

a sensing distance related requirement;

a sensing area related requirement;

a sensing object related requirement;

a sensing error related requirement;

a sensing signal quality related requirement; or a sensing delay related requirement.

17. The method according to claim 16, wherein the configuration information of the first signal indicates at least one of:

a waveform of the first signal;

a sub-carrier spacing of the first signal;

a guard interval of the first signal;

a bandwidth of the first signal;

a duration of the first signal;

a time domain interval of the first signal;

sending signal power of the first signal;

a signal format of the first signal;

a signal direction of the first signal;

a time resource of the first signal; or a frequency domain resource of the first signal.

18. The method according to claim 16, wherein the second message comprises:

the configuration information of the first signal, or, an index number, wherein the index number is associated with the configuration information of the first signal.

19. A communication device, comprising a processor, a memory, and a program or instructions stored in the memory and executable on the processor, wherein when the program or the instructions are executed by the processor, steps of the signal sending method according to claim 16 are implemented.

20. The method according to claim 16, wherein the first message further indicates sending the first signal by the first device, or sending the first signal by the third device;

the receiving, by the third device, the second message sent by the second device comprises:

receiving, by the third device, the second message sent by the second device based on the indication of the first message.

* * * * *